United States Patent [19]

Ogino et al.

[11] 4,452,266

[45] Jun. 5, 1984

[54] AIR ASPIRATION DEVICE OF AIRCRAFT-MOUNTED GAS-TURBINE ENGINE

[75] Inventors: Saburo Ogino, Utsunomiya; Yoshitomo Taniguchi, Kagamihara; Satoshi Kiyoshima, Utsunomiya, all of Japan

[73] Assignee: Fuji Jukogyo Kabushiki Kaisha, Tokyo, Japan

[21] Appl. No.: 319,022

[22] Filed: Nov. 6, 1981

[30] Foreign Application Priority Data

Nov. 15, 1980 [JP] Japan ................................. 55-161089

[51] Int. Cl.³ ............................................. B64D 27/20
[52] U.S. Cl. .................................. 137/15.1; 244/53 B
[58] Field of Search ............................. 137/15.1, 15.2; 244/53 B, 54

[56] References Cited

U.S. PATENT DOCUMENTS 4,234,188  6/1981  DeBlois ........................ 137/15.1 X Primary Examiner—Alan Cohan
Attorney, Agent, or Firm—Martin A. Farber

[57] ABSTRACT

A triangular airfoil plate is forward of and below the air intake duct of an aircraft-mounted gas-turbine engine, and a small airfoil member is below the airfoil plate. An inductive action of leading-edge separation vortices generated from the leading edges of the airfoil plate and the small airfoil member is utilized to curve the direction of air flowing into the air intake duct and thereby to prevent turbulence in the intake airflow and resulting defective operation or failure of the engine during flight of the aircraft at large angles of attack.

23 Claims, 23 Drawing Figures

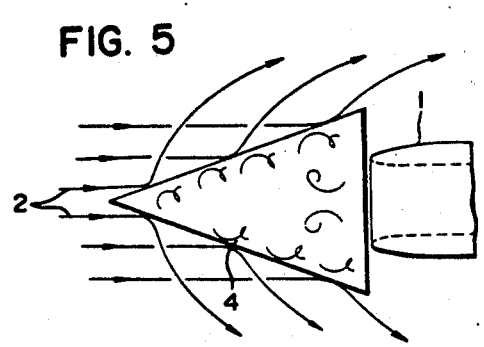
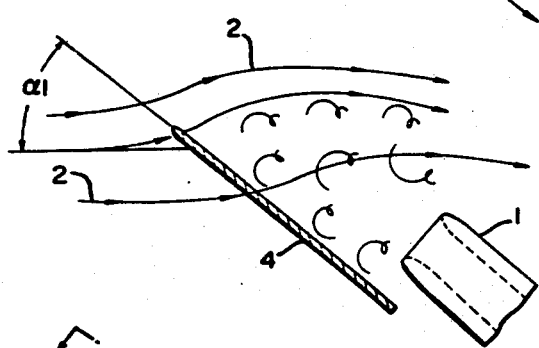
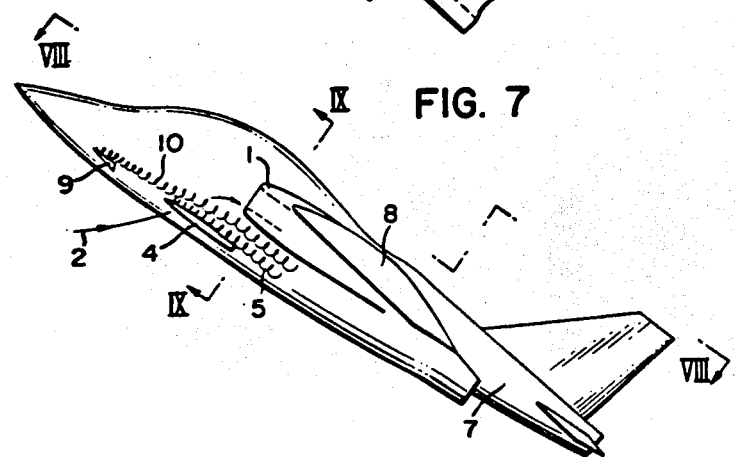

AIR ASPIRATION DEVICE OF AIRCRAFT-MOUNTED GAS-TURBINE ENGINE

BACKGROUND OF THE INVENTION

This invention relates generally to air suction or aspiration devices of gas-turbine engines mounted on aircraft. More particularly, the invention relates to an air aspiration device affording stable air aspiration through the air intake duct and improvement of the air aspiration efficiency.

During normal flight of an aircraft powered by a gas-turbine engine, the air aspirated or drawn into its engine flows smoothly along fair streamlines without any turbulence. However, when the aircraft assumes a flight state such as a spin in which it maneuvers forward with a large angle of attack, or angle of incidence (which may reach a value as high as 50 degrees in some cases), the angle of the incident air flow relative to the centerine of the air intake duct becomes large until, ultimately, the air stream which has entered the air intake duct separates away therefrom from a point near the lower leading edge thereof. The flow of the aspirated air thus becomes greatly turbulent, and the air aspiration efficiency drops.

When the aircraft assumes the above described condition, as described hereinafter with reference to illustrations, its engine, or engines, will operate defectively and eventually stop, and flight thereafter will become difficult. Thus, the above described condition is very dangerous.

Consequently, the only recourse for avoiding this danger has heretofore been, ordinarily, to resort to a regulatory limitation such as banning or restricting maneuvers entailing large angles of attack such as spinning. This measure results in a great reduction in the performance value of the airframes of aircraft such as fighter planes and trainers therefor which are required to possess high degrees of maneuverability.

In order to remove this limitation, some fighter planes are provided with means such as a movable leading edge of each air intake duct, the direction of the leading edge being adjusted in accordance with the flight state. However, for deriving full effectiveness from such means, a complicated and expensive movement control mechanism is necessary, and, moreover, the weight of the air intake structure increases. Thus, this measure is not desirable.

SUMMARY OF THE INVENTION

Accordingly, it is contemplated in this invention to provide an air aspiration device of a gas-turbine engine mounted on an aircraft, which air aspiration device has a simple, inexpensive construction, presents almost no problem with respect to weight increase, and is capable of obtaining a stable aspirated air flow even when the aircraft is in a state of large angle of attack.

According to this invention, briefly summarized, there is provided an air aspiration device of an aircraft-mounted gas-turbine engine comprising an airfoil structure having a substantially triangular shape in plan view and disposed forward of and relative to the horizontal direction of the aircraft below the air intake duct of the engine and at least one small airfoil member disposed below the airfoil structure, an inductive action of leading-edge separation vortices generated from the leading edges of the airfoil structure and small airfoil member being utilized to aerodynamically curve the direction of air flowing into the air intake duct and thereby to prevent turbulence in the intake air flow and resulting defective operation or failure of the engine during flight of the aircraft at large angles of attack.

The nature, utility, and further features of this invention will be more clearly apparent from the following detailed description when read in conjunction with the accompanying drawings, briefly described below.

BRIEF DESCRIPTION OF THE DRAWINGS

In the drawings:

FIGS. 5 and 6 are respectively a top view and a side view similar to FIGS. 3 and 4 of the same air intake duct and airfoil plate, showing the state of a larger angle of attack in which the leading-edge separation vortices have broken down and are lost, whereby the air flow has become turbulent;

FIG. 7 is a port side view of an aircraft to which an example of the air aspiration device of this invention has been applied;

FIGS. 17b, 18b, and 19b are side views, in vertical section, showing air flow states within the air intake duct respectively corresponding to FIGS. 17a, 18a, and 19a.

DETAILED DESCRIPTION OF THE INVENTION

Figure 1:
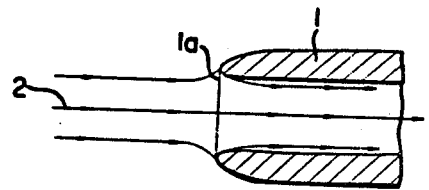
FIG. 1 is a side view, in longitudinal section, indicating the air flow into the air intake duct of a gas turbine engine in a normal state.
Figure 2:
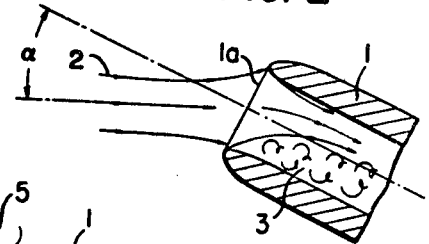
FIG. 2 is a side view, in longitudinal section, indicating the air flow toward and in the same air intake duct in a state wherein it is at an angle of attack (or angle of incidence) relative to the path of its travel.

FIG. 1 illustrates the case of normal flight of an aircraft powered by a gas-turbine engine and indicates the flow of air relative to the air intake duct 1 of the engine. As mentioned hereinbefore, the air flow indicated by arrow sign 2 has no turbulence and is smooth. However, when the aircraft assumes a flight state of large angle of attack due to a maneuver such as spinning, the angle $\alpha$ of the air stream 2 relative to the centerline of the air intake duct 1 becomes large as indicated in FIG. 2. Ultimately, as indicated also in FIG. 2, the air flow separates as indicated at 3 from the vicinity of the leading edge inlet 1a of the air intake duct 1. Consequently the aspirated air flow becomes very turbulent, and the aspiration efficiency drops.

The angle $\alpha$ at which air separation begins is of the order of 30 degrees, in general. As stated hereinbefore, when an aircraft assumes the flight state indicated in FIG. 2, the engine mounted thereon operates defectively and finally stops. Thereafter, flight becomes difficult because of loss of thrust, and the aircraft is placed in a very dangerous state.

This invention seeks to eliminate this danger by providing a novel air intake device of a mechanical organization as summarized hereinabove, the basic concept of which is illustrated in FIGS. 3 through 6.

Figure 3:
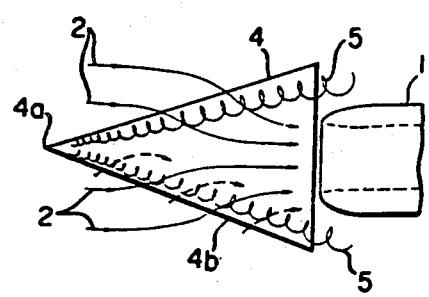
FIG. 3 is a top view showing an airfoil-like plate provided in front of and below the inlet of the air intake duct and indicating the formation of vortices separating from the leading edge of the airfoil plate.
Figure 4:
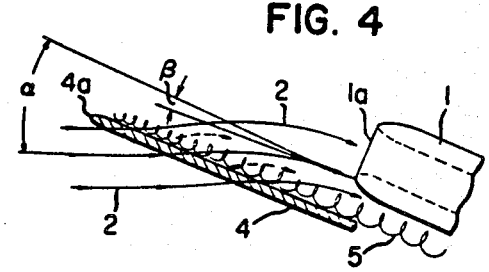
FIG. 4 is a side view of the air intake duct and the airfoil plate shown in FIG. 3.
Figure 8:
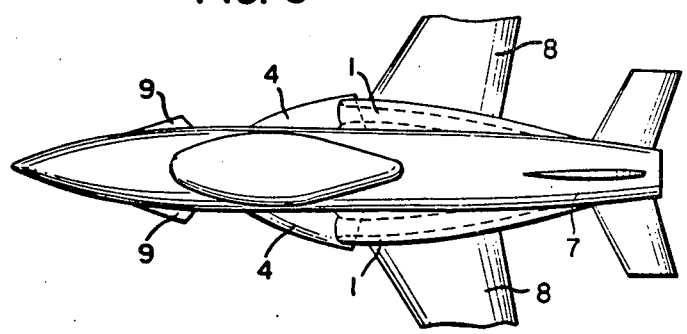
FIG. 8 is a view taken in the plane indicated by line VIII—VIII in FIG. 7 as viewed in the arrow direction.
Figure 9:
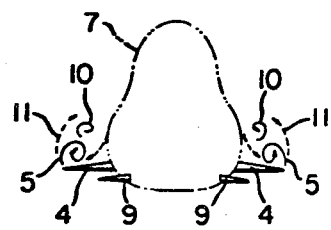
FIG. 9 is a simplified section taken along the plane indicated by line IX—IX in FIG. 7 as viewed in the arrow direction.
Figure 10:
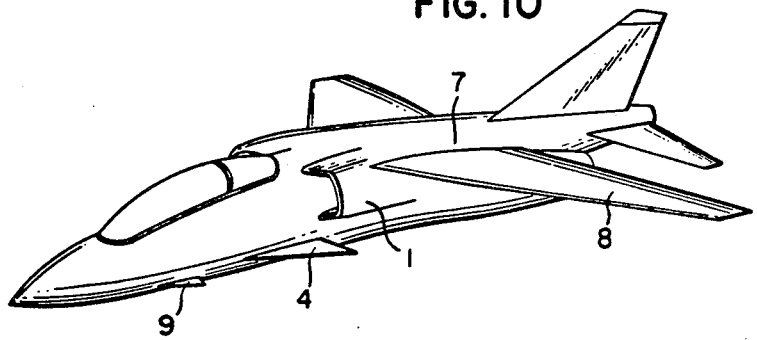
FIG. 10 is a perspective view, as viewed from above, in front of, and on the port side of the same aircraft.

Referring first to FIGS. 3 and 4, an airfoil-like plate 4 (hereinafter referred to as an "airfoil plate" or "plate") is fixedly supported on an aircarft at a position in front of, below, and somewhat separated from the inlet 1a of the intake duct 1 of an engine mounted on the aircraft. This airfoil plate 4 is a flat plate having a shape in plan view substantially of an isosceles triangle with its vortex 4a relative to the horizontal position of the aircraft at the front and its base below the inlet 1a and is substantially parallel to the centerline of the air intake duct 1.

When, with an airfoil plate 4 of the above described construction, the air intake duct 1 assumes a state in which it is at a geometrical angle of attack $\alpha$ relative to the general incident air flow 2, leading-edge separation vortices 5 develop from the vertex 4a of the airfoil plate 4 along the swept back leading edge 4b. As a consequence of an inductive action due to the velocity (represented by intermittent-line arrows) of these separation vortices, the general air flow 2, after passing the leading edges 4b, is deflected inward and downward, toward the region between the leading-edge separation vortices 5 and thus assumes a smooth flow pattern along the upper surface of the airfoil plate 4.

Then, as a result of this effect, the actual angle $\beta$ of the leading edge 1a or inlet of the air intake duct 1 relative to the incident air flow 2 is maintained at an extremely small value in comparison with the geometrical angle of attack $\alpha$. Furthermore, even when the geometrical angle of attack $\alpha$ increases and exceeds that angle (as indicated in FIG. 2) at which the air flow would separate at the leading-edge 1a of the air intake duct 1 without the airfoil plate 4, the actual angle $\beta$ can be maintained at an amply small value as long as the leading-edge separation vortices 5 remain above the airfoil plate 4.

Thus, by providing a triangular airfoil plate 4 as described above, development of turbulence in the aspirated air flow and a drop in the air aspiration efficiency can be prevented.

However, when the angle of attack $\alpha$ shown in FIG. 4 exceeds a certain limiting angle, breakdown of the vortices reaches the vertex 4a of the plate 4, and the leading-edge separation vortices 5 collapse. When such a collapse arises, the air flow 2 in the vicinity of the air intake duct 1 becomes greatly disturbed and turbulent, and the fundamental effect of the airfoil plate 4 becomes lost. This state is as indicated in FIGS. 5 and 6, in which the geometrical angle of attack $\alpha_1$ has exceeded the above mentioned limiting angle.

In view of the above described phenomena, we have carried out a large number of wind-tunnel tests in which various triangular airfoil structures were disposed on aircraft fuselages so as to derive effects of preserving the air flow into air intake structures. As one result, we have found that the above mentioned limiting angle of attack of an aircraft is from 35 to 40 degrees, and that, in order to derive in a practical manner the effect of triangular airfoil structure in stabilizing the intake air of engines, further development and innovations were necessary.

Accordingly, in accordance with this invention, in addition to triangular airfoil structures, other small airfoil members are provided in order to further enhance the effect of stabilizing the intake air, and in this manner this stabilizing effect has been reduced to practice.

In one embodiment of this invention as illustrated in FIGS. 7 through 10, an example of the air intake device is installed on an aircraft having a fuselage 7 and a main wing 8 and powered by two gas-turbine engines (not shown). The respective air intake ducts 1 of these engines are fixedly installed at the root parts of the starboard and port wings 8 at positions in front of the leading edges thereof. An airfoil structure 4 of substantially triangular shape in plan view is fixed to the fuselage 7 at a position forward of and below each air intake duct 1.

An important feature of this invention is that, in addition to the airfoil structures 4, a small airfoil member 9, which is smaller than the airfoil structure 4 and has a small aspect ratio, is fixed to the fuselage 7 in front of each airfoil structure 4. In the example illustrated, each small airfoil member 9 has a substantially triangular shape in plan view. As a minimum requisite, this small airfoil member 9 is disposed at a position lower than that of the airfoil structure 4 with respect to the horizontal position of the aircraft. In the illustrated example, each small airfoil member 9 is disposed in front of and below the corresponding airfoil structure 4 substantially parallel thereto and spaced apart therefrom.

During flight of this aircraft provided with the air intake device of the above described structural arrangement, the aircraft flying with an angle of attack, a leading-edge separation vortex 5 is formed on the upper surface of each triangular airfoil structure 4 similarly as in the example described in conjunction with FIGS. 3 and 4. Similarly, a leading-edge separation vortex 10 is formed also on the upper surface of each small airfoil member 9. This leading-edge separation vortex 10 flows rearwardly and over the upper surface of the corresponding airfoil structure 4 as indicated in FIG. 7.

The circulational velocity (as indicated by the intermittent-line arrow 11 in FIG. 9) of this leading-edge separation vortex 10 has an inductive effect by which the leading-edge separation vortex 5 above the airfoil structure 4 is accelerated and, at the same time, is thrust outwardly (in the direction of separation from the fuselage 7). As a result, there is obtained an advantageous effect of suppression of the collapse or breakdown of the leading-edge separation vortex 5.

The small airfoil member 9 on each side is so mounted on the fuselage 7 that its own leading-edge separation vortex 10 will be stably generated up to an angle of attack which is amply greater than the limiting angle of attack of the airfoil structure 4 itself. This can be effectively accomplished by positioning and orienting the small airfoil member 9 so that its forward part dips slightly downward or so that its forward part is directed slightly inboard, that is, so that the root part of the small airfoil member 9 joining the fuselage 7 curves inboard in the forward direction.

For the same reason as set forth above, it is desirable in some cases to further provide another small airfoil member in front of the small airfoil member 9.

Figure 11:
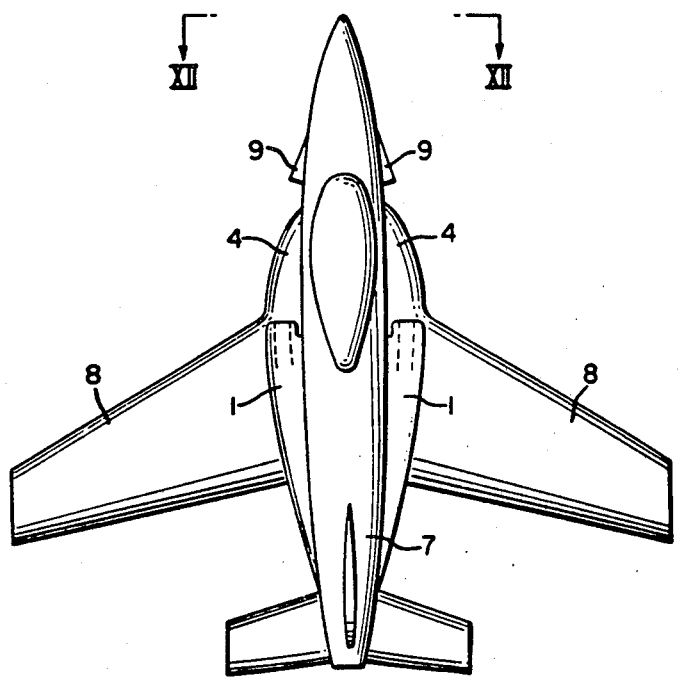
FIG. 11 is a top view showing another example of application of the air aspiration device according to the invention.
Figure 12:
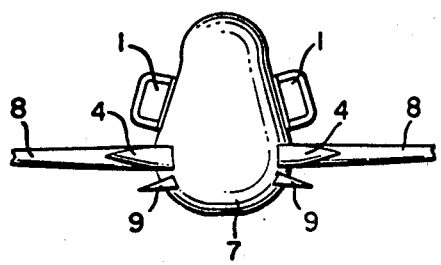
FIG. 12 is a partial front view taken in the plane indicated by line XII—XII in FIG. 11 as viewed in the arrow direction.

In another embodiment of this invention as shown in FIGS. 11 and 12, the air aspiration device thereof is applied to a low-wing aircraft. In this example, the airfoil structure 4 on each side of the fuselage 7 is formed by elongating in the forward direction the leading edge of the main wing 8 at its root part joined to the fuselage. A small airfoil 9 is fixed to each side surface of the fuselage 7 similarly as in the preceding example. The example of the air aspiration device of this invention comprising the airfoil structures 4 and the small airfoil members 9 operates to stabilize the intake air flow in air intake ducts 1 on opposite sides of the fuselage 7.

Figure 13:
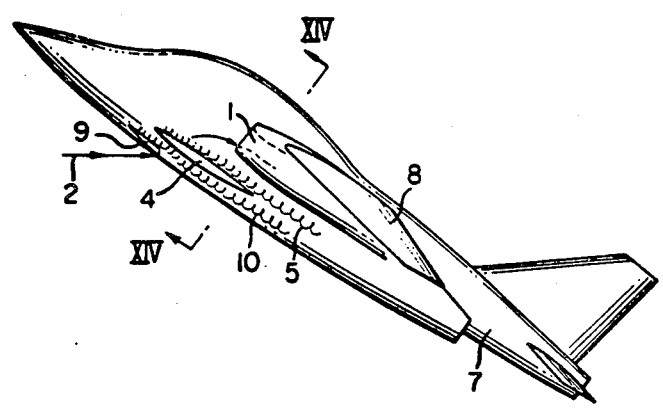
FIG. 13 is a port side view showing still another example of application of the device of the invention.
Figure 14:
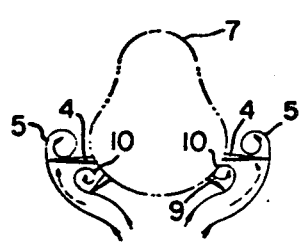
FIG. 14 is a simplified section taken along the plane indicated by line XIV—XIV in FIG. 13 as viewed in the arrow direction.

In still another embodiment of this invention as shown in FIGS. 13 and 14 a small airfoil member 9 is fixed to the fuselage 7 on each side thereof at a position immediately below the leading-edge part of an airfoil structure 4 and with an oblique orientation downward and outward. In this example, the leading-edge separation vortex 10 of each small airfoil member 9 is generated in steady state below the lower surface of the airfoil structure 4. For this reason, an inductive effect arising from the velocity (as indicated by intermittent line arrows in FIG. 14) of the leading-edge separation vortex 10 of each small airfoil member 9 causes the leading-edge separation vortex 5 above the corresponding airfoil structure 4 to accelerate and, at the same time, reduces the angle of the general air flow, and breakdown of the leading-edge separation vortex 5 above the airfoil structure 4 is prevented.

In the case of this example, also, each small airfoil member 9 is preferably so formed and mounted that its forward part is directed slightly inboard so that the leading-edge separation vortex 10 of each small airfoil member 9 itself will be generated in a stable manner up to an angle of attack which is amply greater than the limiting angle of attack of the airfoil structure 4 itself.

A feature of this example is that the intake air flow can be maintained in a stable state even when the aircraft is in a state of side slipping at a great sideslip angle with a large angle of attack.

Figure 15:
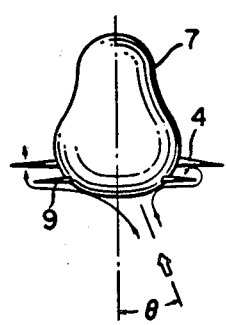
FIGS. 15 and 16 are simplified views similar to FIG. 14, indicating a difference in the effectivenesses during side slipping of small airfoil members of different mounting directions.

An aircraft flying with a large angle of attack is in an unstable state and easily undergoes a motion accompanied by a sideslip of a large angle such as, for example, a spin. When an aircraft having substantially horizontal small airfoil members 9 as shown in FIG. 15 undergoes a sideslip of a sideslip angle $\theta$, the generation of the leading-edge separation vortex of the small airfoil member 9 on the downward side with respect to the sideslip air flow, that is, the left-hand side as viewed in FIG. 15, stops.

Figure 16:
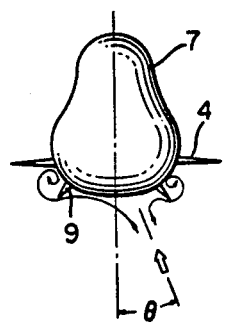

In contrast, when the small airfoil members 9 are directed obliquely downward and outward as in the above described example illustrated in FIGS. 13 and 14, a sideslip of a sideslip angle $\theta$ has little effect, as indicated in FIG. 16, and a leading-edge separation vortex is formed above each small airfoil member 9. As will be apparent from FIG. 16, when each small airfoil member 9 is projecting obliquely downward and outward, the air readily flows in a direction to traverse the leading edge of the small airfoil member 9, and a separation vortex is generated. In the case of a configuration as shown in FIG. 15, however, the air flows in the direction of the leading edge of the small airfoil member 9 along the lower surface thereof, whereby a separation does not occur.

The above described disturbance of the aspirated air flow occurs when the angle of attack exceeds a certain limit and signifies an offsetting or distortion of the total pressure distribution of the aspirated air flow at the engine air intake inlet plane. The degree of this distortion can be numerically expressed by the distortion parameter (DP) of Rolls-Royce Ltd., England, which parameter is defined as follows:

$$DP = \frac{\left[\begin{array}{c}\text{The sum of the area}\\\text{weighted total pressure}\\\text{measurements divided by}\\\text{the engine compressor}\\\text{face area}\end{array}\right] - \left[\begin{array}{c}\text{The minimum value of area}\\\text{mean total pressure over}\\\text{any 60 degree sector of}\\\text{the appropriate area of}\\\text{the engine compressor face}\end{array}\right]}{\left[\begin{array}{c}\text{Dynamic pressure at the engine face based on}\\\text{the area weighted average total pressure over}\\\text{the entire engine compressor face}\end{array}\right]}$$

It is said that the absolute values of the distortion parameter at which the engine can operate satisfactorily are less than 0.15.

Figure 17A:
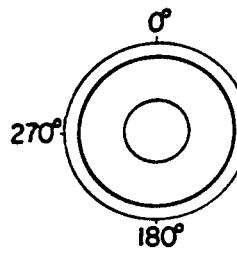
FIGS. 17a, 18a, and 19a are graphs respectively indicating distributions of total pressure of aspirated air flows in three different cases.
Figure 18A:
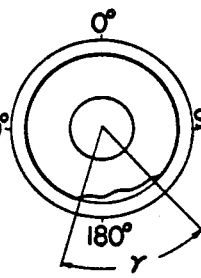
Figure 19A:
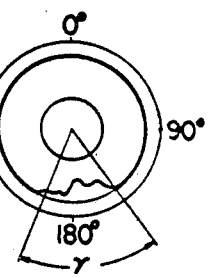

FIGS. 17a, 18a, and 19a are circular graphs representing distortion of the total pressure in the circumferential direction of the aspirated air stream. In each of these graphs the radially inward direction represents the direction of reduction of pressure, while the radially outward direction represents the pressure-increase direction.

Figure 17B:
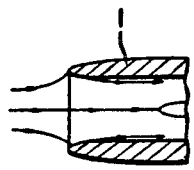
Figure 18B:
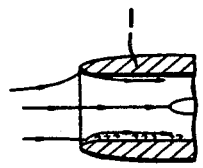
Figure 19B:
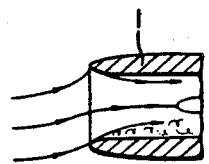

FIG. 17a shows an example of the case of no flow disturbance or turbulence, in which the distortion parameter is zero. FIG. 17b indicates the state of air flow into the air intake duct 1 in this case. FIG. 18a is a graph indicating the state of some small turbulence as shown in FIG. 18b being generated in a range of a partial angle $\gamma$ of 60 degrees. The absolute value of the distortion parameter in this case is 0.1, which is not detrimental to the engine operation. FIG. 19a is a graph of the case of great air turbulence as shown in FIG. 19b, which is being generated in the range of the 60-degree partial angle $\gamma$ of minimum total pressure. The absolute value of the distortion parameter in this case is 0.3, and the engine operation becomes defective.

Figure 20:
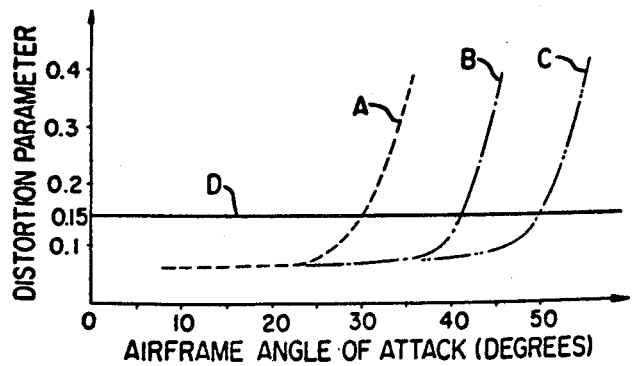
FIG. 20 is a graph indicating the effectiveness of the invention.

FIG. 20 shows in graphical form by means of distortion parameters the effectiveness of this invention as confirmed by wind-tunnel tests. In this graph, the ordinate represents the absolute value of the distortion parameter, while the abscissa represents the airframe angle of attack. Curve A indicates the test result in the case of an ordinary air intake duct. Curve B indicates the result in the case where only the airfoil structure 4 was installed. Curve C indicates the result in the case of the air intake of this invention. Furthermore, line D represents the absolute value of the distortion parameter of the limit of defective engine operation, the region above this line D being that of defective operation.

As is apparent from this graph, in the case of this invention, the maximum limit of the angle of attack has reached a value in the neighborhood of 50 degrees, which is approximately 20 degrees greater than the limiting angle of attack of 30 degrees in the conventional case and is approximately 10 degrees greater than the limiting angle of attack of approximately 40 degrees in the case where only the airfoil structure 4 is provided.

As described with respect to the above example of practice, the air intake device of this invention comprises a substantially triangular airfoil structure provided relative to the longitudinal position of the aircraft forward of and below each engine air intake duct and, further, at least one small airfoil member disposed relative to the longitudinal position of aircraft below the airfoil structure, whereby the breakdown of the leading-edge separation vortices is retarded, and, as a result of the inductive action of the leading-edge separation vortices, the air flow toward the air intake duct is curved and caused to assume a stable state. Therefore, the air inspiration efficiency is improved, and it becomes possible for the aircraft to maneuver safely at large angles of attack.

While this invention has been described above with respect to examples of the air aspiration device in which the airfoil structure and the small airfoil members are permanently fixed to the air frame, the scope of this invention is intended to include such airfoil structures which can be readily retracted out of the air flow into parts of the airframe and extended out of such parts into the air flow as prescribed by the pilot.

We claim:

1. An air aspiration device of an aircraft-mounted gas-turbine engine comprising an airfoil structure having a substantially triangular shape in plan view and disposed relative to a substantially horizontal position of the aircraft forward of and below the air intake duct of the engine, and at least one small airfoil member disposed relative to the substantially horizontal position of the aircraft below the airfoil structure, an inductive action of leading-edge separation vortices generated from the leading edges of the airfoil structure and small airfoil member being utilized to aerodynamically curve the direction of air flowing into the air intake duct and thereby to prevent turbulence in the intake air flow and resulting defective operation or failure of the engine during flight of the aircraft at large angles of attack.

2. An air aspiration device according to claim 1 in which the small airfoil member is disposed at a position in the vicinity of the leading edge of the airfoil structure with respect to the forward-aft direction of the aircraft.

3. An air aspiration device according to claim 1 in which the small airfoil member is disposed at a position forward of the leading edge of the airfoil structure.

4. An air aspiration device according to claim 1 in which the small airfoil member is substantially triangular in plan view.

5. An air aspiration device according to claim 1 in which the small airfoil member is orientated substantially parallel to the airfoil structure.

6. An air aspiration device according to claim 1 in which the small airfoil member has an outer tip which is directed obliquely downward as viewed in the direction of the longitudinal axis of the fuselage of the aircraft.

7. An air aspiration device according to claim 1 in which each of the airfoil structure and the small airfoil member is fixed to a side surface of the airframe of the aircraft.

8. An air aspiration device according to claim 1 in which the airfoil structure is fixedly secured to a leading-edge part of the main wing of the aircraft.

9. The device as set forth in claim 1, wherein said small airfoil member is at a position immediately below the leading edge part of said airfoil structure and with an oblique orientation downward and outward.

10. The device as set forth in claim 1, wherein said small airfoil member has a forward part extending slightly downwardly relative to a substantially horizontal position of the aircraft.

11. The device as set forth in claim 1, wherein said small airfoil member has a forward part slightly inboard so that the root part of the small airfoil member joining the fuselage curves inboard in the forward direction.

12. The device as set forth in claim 2, wherein the small airfoil member is orientated substantially parallel to the airfoil structure.

13. The device as set forth in claim 3, wherein the small airfoil member is orientated substantially parallel to the airfoil structure.

14. The device as set forth in claim 4, wherein the small airfoil member is orientated substantially parallel to the airfoil structure.

15. The device as set forth in claim 2, wherein the small airfoil member has an outer tip which is directed obliquely downward as viewed in the direction of the longitudinal axis of the fuselage of the aircraft.

16. The device as set forth in claim 3, wherein the small airfoil member has an outer tip which is directed obliquely downward as viewed in the direction of the longitudinal axis of the fuselage of the aircraft.

17. The device as set forth in claim 4, wherein the small airfoil member has an outer tip which is directed obliquely downward as viewed in the direction of the longitudinal axis of the fuselage of the aircraft.

18. The device as set forth in claim 2, wherein each of the airfoil structure and the small airfoil member is fixed to a side surface of the airframe of the aircraft.

19. The device as set forth in claim 3, wherein each of the airfoil structure and the small airfoil member is fixed to a side surface of the airframe of the aircraft.

20. The device as set forth in claim 4, wherein each of the airfoil structure and the small airfoil member is fixed to a side surface of the airframe of the aircraft.

21. The device as set forth in claim 2, wherein the airfoil structure is fixedly secured to a leading-edge part of the main wing of the aircraft.

22. The device as set forth in claim 3, wherein the airfoil structure is fixedly secured to a leading-edge part of the main wing of the aircraft.

23. The device as set forth in claim 4, wherein the airfoil structure is fixedly secured to a leading-edge part of the main wing of the aircraft.

* * * * *